United States Patent [19]
Freeman

[11] Patent Number: 5,185,596
[45] Date of Patent: Feb. 9, 1993

[54] ELECTRONIC IMAGE MODIFICATION

[75] Inventor: Stephen Freeman, Bedfordshire, England

[73] Assignee: Crosfield Electronics Ltd., England

[21] Appl. No.: 644,657

[22] Filed: Jan. 23, 1991

[30] Foreign Application Priority Data

Jan. 23, 1990 [GB] United Kingdom ............... 9001517

[51] Int. Cl.⁵ ............................................. G09G 3/02
[52] U.S. Cl. .................................. 340/706; 340/723; 340/747
[58] Field of Search ............. 340/723, 730, 728, 725, 340/747, 706, 709; 395/130, 138, 129, 127, 141

[56] References Cited

U.S. PATENT DOCUMENTS

| | | | |
|---|---|---|---|
| 4,788,538 | 11/1988 | Klein et al. | 340/728 |
| 4,929,938 | 5/1990 | Horiguchi | 340/728 |
| 4,958,272 | 9/1990 | Wake | 395/132 |
| 5,016,183 | 5/1991 | Shyong | 395/130 |

OTHER PUBLICATIONS

Lisa Draw, 1984, pp. 10, 30-31, 50-54, 80-81, 98-105, 190.

Primary Examiner—Alvin E. Oberley
Assistant Examiner—A. Au
Attorney, Agent, or Firm—Sughrue Mion Zinn Macpeak & Seas

[57] ABSTRACT

An apparatus for electronically modifying the appearance of an image stored in the form of digital data defining the color content of the image comprises a store (8) for storing sets of coordinates defining positions around the edge of the image and, for each set of coordinates, storing the characteristics of an electronic painting tool including the profile of the tool. A monitor (30) displays the image. A processor (1, 15-19) compares the current position of the tool with the sets of stored coordinates and when the tool is at or in the region of a set of stored coordinates changes the tool characteristics to those previously determined for that set of coordinates.

3 Claims, 3 Drawing Sheets

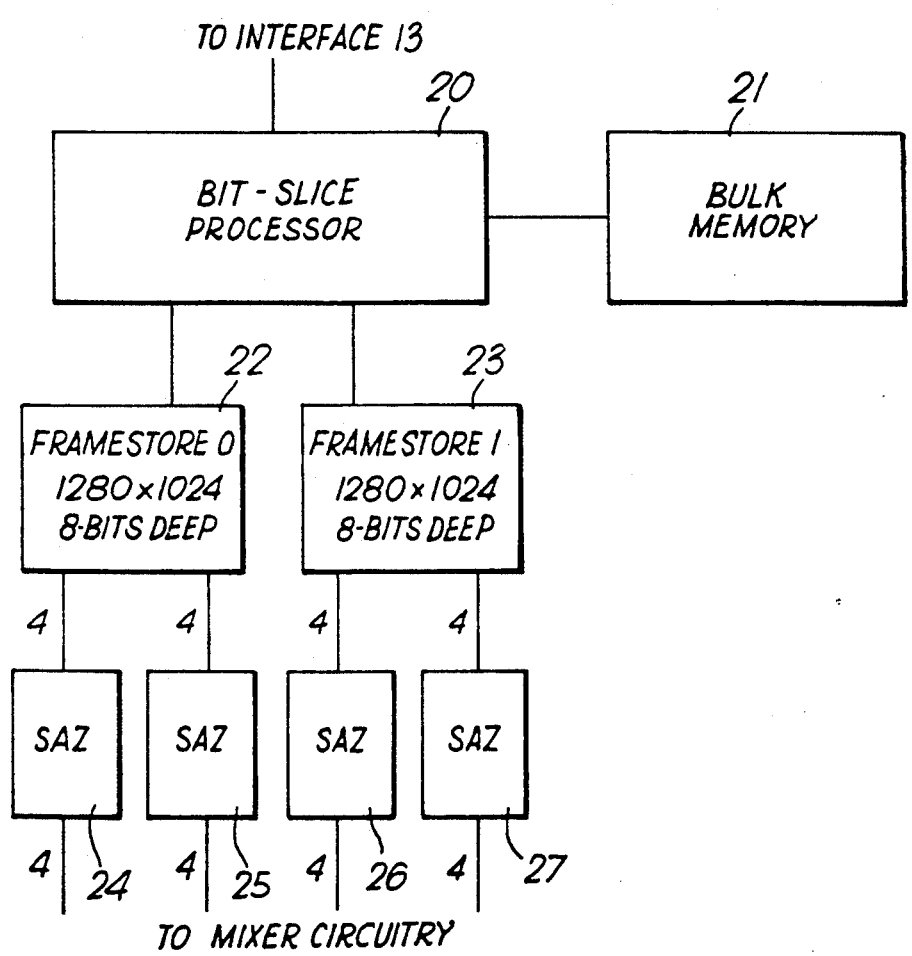

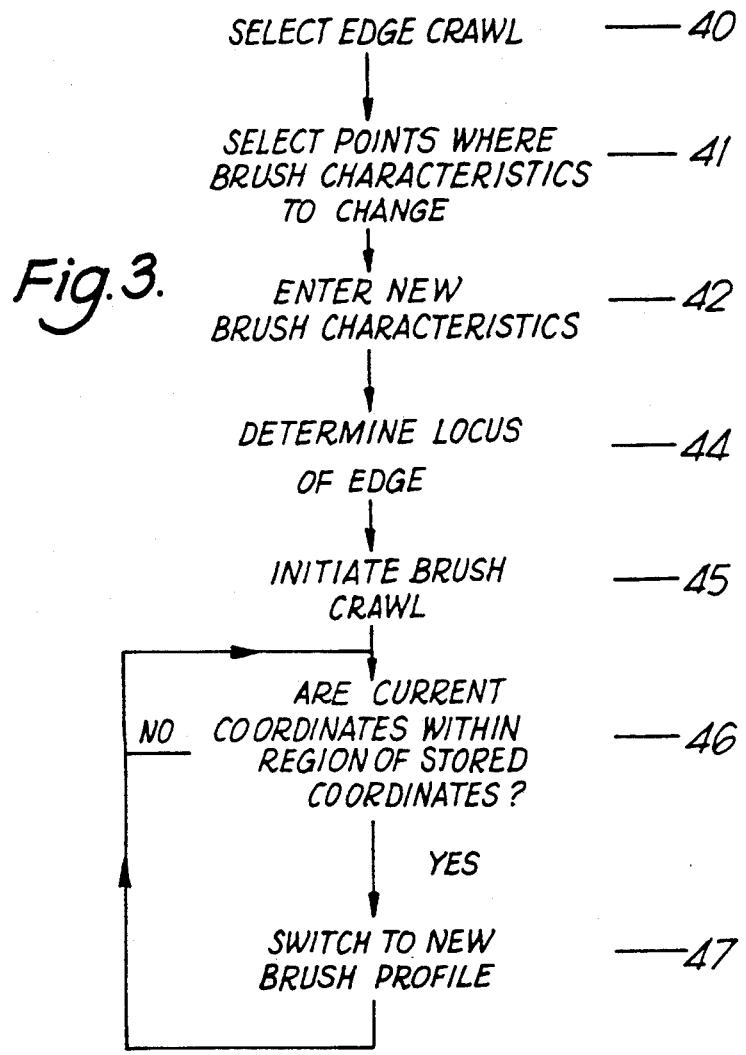
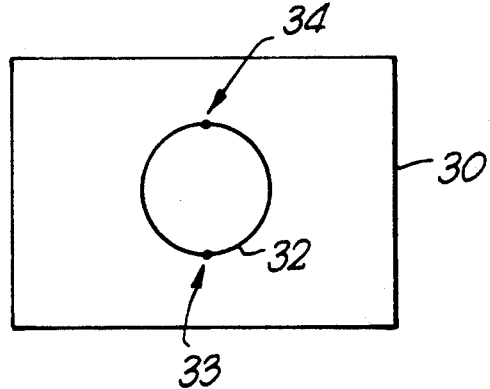

ELECTRONIC IMAGE MODIFICATION

FIELD OF THE INVENTION

The invention relates to method and apparatus for electronically modifying the appearance of an image.

DESCRIPTION OF THE PRIOR ART

It is known to a thicken the edge of an image electronically by causing an electronic paint brush to "crawl" around the edge of the image. This function has limited application and there is a need to be able to generate easily more complex features.

SUMMARY OF THE INVENTION

In accordance with one aspect of the present invention, a method of electronically modifying the appearance of an image stored in the form of digital data defining the colour content of the image comprises storing sets of co-ordinates defining positions around the edge of the image; for each set of co-ordinates storing the characteristics of an electronic painting tool including the profile of the tool; and thereafter displaying the image, guiding the painting tool around the edge of the image, comparing the current position of the tool with the sets of stored co-ordinates, and when the tool is at or in the region of a set of stored co-ordinates, changing the tool characteristics to those previously determined for that set of co-ordinates.

In accordance with a second aspect of the present invention, apparatus for electronically modifying the appearance of an image stored in the form of digital data defining the colour content of the image comprises a store for storing sets of co-ordinates defining positions around the edge of the image and, for each set of co-ordinates, storing the characteristics of an electronic painting tool including the profile of the tool; a monitor for displaying the image; and processing means for guiding the painting tool around the edge of the image, comparing the current position of the tool with the sets of stored co-ordinates, and when the tool is at or in the region of a set of stored co-ordinates, changing the tool characteristics to those previously determined for that set of co-ordinates.

We have devised a new method and apparatus which enables many complex characteristics to be relatively easily obtained. For example, the method enables not only features such as drop shadowing and embossing to be achieved but other new, creative effects.

The tool (or brush) profile can comprise one or both of the geometric form of the tool and the density variation within the area of the tool, while other tool characteristics include the colour laid down by the tool.

The sets of co-ordinates and tool characteristics can be stored in the form of a look-up table.

BRIEF DESCRIPTION OF THE DRAWINGS

An example of a method and apparatus according to the invention will now be described with reference to the accompanying drawings, in which:

FIG. 2 is a block diagram of a graphics image processor of FIG. 1;

FIG. 3 is a flow diagram illustrating operation of the apparatus; and,

FIG. 4 illustrates an image to which the method is applied.

DETAILED DESCRIPTION OF THE EMBODIMENT

Figure 1:
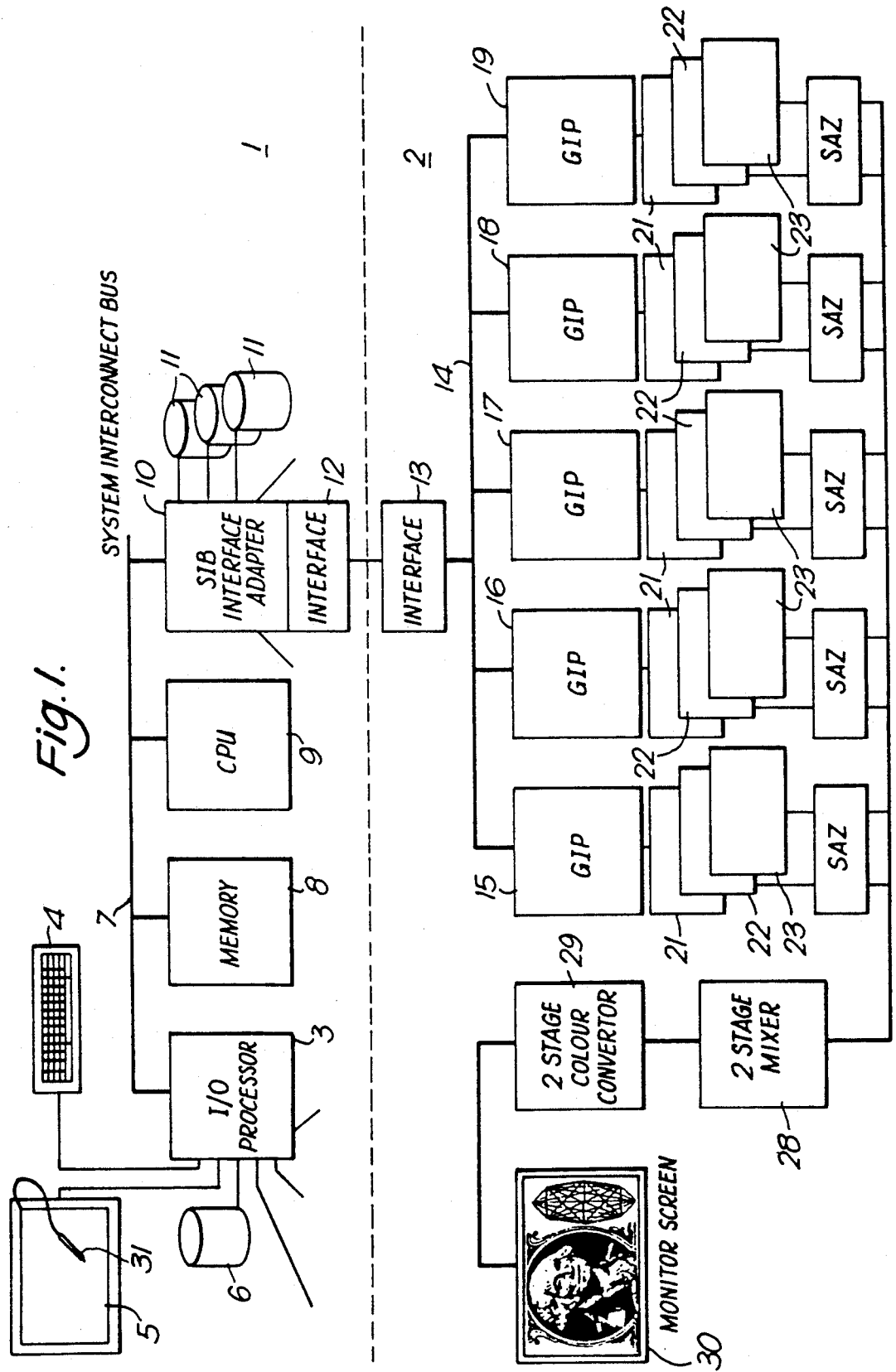
FIG. 1 is a block diagram of the apparatus.

The apparatus shown in FIG. 1 can be divided into two primary parts. These comprise the host 1 and the graphics sub-system 2. The division is shown in FIG. 1 by a dashed line. The host 1 is a 68020 microprocessor based system running UNIX which is a multi-tasking, multi-user operating system. The host comprises an I/0 processor 3 coupled to a keyboard 4, a digitizing tablet 5 and associated pen 31, a system disk 6 and other data sources (not shown). The I/0 processor 3 is connected to a system inter-connect bus (SIB) 7 which is connected to ROM and RAM memory 8, a CPU 9, and an interface adapter 10. The interface adapter 10 is connected to a number of high speed image discs 11 which hold data defining the colour content of pixels of images at high resolution, the adapter also being connected via an interface 12 with the graphics sub-system 2. As mentioned above, the host has a conventional form and will not be described in detail. However, the SIB 7 is described in more detail in EP-A-0332417.

The programme that runs on the host is a single "process" which reads and processes inputs from the digitizing tablet 5 under operator control and directs the graphics part 2 to display the host's responses to those inputs on the graphics monitor 30. Essentially, the system takes advantage of the host system in being able to perform a majority of the calculations so that only a small amount of control data is passed to the graphics sub-system. This graphics part 2 is much better than the host 1 at creating and manipulating graphical objects but the host is better at controlling input/output to peripherals, discs and tapes and is relatively easy to programme.

The graphics sub-system 2 comprises an interface 13 which connects the graphics part to the host the interface 13 being connected to a bus 14. The bus 14 is connected to five graphics image processors (GIPs) 15-19. In this embodiment, it is assumed that the images are defined by four colour components, namely cyan, magenta, yellow and black, there being a separate GIP for each colour. Thus, the GIP 15 processes the cyan colour component, the GIP 16 the magenta colour component. the GIP 17 the yellow colour component and the GIP 18 the black colour component. If the image was represented by a different number of colour components, for example red, green and blue then only three of the GIPs would be needed. The advantage of providing the GIPs 15-18 in parallel is that each component of each pixel in the image can be processed in parallel so that the overall processing time is reduced by up to four times over the processing time with a single processor. A further advantage of using the GIPs is that each has a bit-slice processor on which the programmer can define instructions useful for a particular application.

A fifth GIP 19 is provided for defining one or more masks and other features.

The construction of one of the GIPs of FIG. 1 is shown in FIG. 2. Each GIP comprises a bit-slice processor 20 coupled to bulk memory 21. This memory 21 will hold image data, brush profiles and text as required and is used as virtual image memory.

The bit-slice processor 20 is also connected to a pair of framestores 22, 23 each of which has dimensions 1280×1024 and is 8 bits deep. In the GIPs 15-18, each framestore will hold 8 bit colour data while in the mask GIP 19 each framestore can be used to hold 8 bit masks or two separate 4 bit masks. Furthermore, one of the framestores in the GIP 19 can be used to display menus in one four bit plane and overlays in the other four bit plane. Overlays comprise construction lines and boxes and the like which are to be displayed on the monitor.

The eight bit data in each framestore 22, 23 is applied in four bit "nibbles" to respective scroll, amplify and zoom circuits 24-27 which operate in a conventional manner to perform one or more of the functions of scroll, zoom and amplify, the outputs from these circuits being fed to a mixer circuit 28. The circuit 28 mixes the data from each of the framestores 22 associated with the GIPs 15-18 with the data from each of the framestores 23 associated with the GIPs 15-18 in accordance with the mask stored in the framestore 22 of the GIP 19. This mixer circuit which operates in two stages is described in more detail in EP-A-0344976.

The output from the mixer circuit 28 is fed to a two stage colour converter 29 which converts the four colour component data to three colour component data e.g. red, green and blue suitable for controlling the display on a monitor screen 30.

In use, images are stored on the high speed image disks and these images may have been generated by scanning original transparencies or other representations or they may have been created electronically using an electronic paint brush. The host causes relevant portions of these images to be "paged" in and out of the bulk memory 21 in the GIPs 15-18 and brush profiles to be loaded and unloaded from the bulk memory 21 in the GIP 19. The interface adaptor 10 has its own 68020 processor to allow it independently to control the disks 11. The GIPs 15-18 are directed by the host 1 to do various things to images in the bulk memory 21 so that when a GIP attempts to access an address in an image that is not currently in its bulk memory then part of that memory is written back to disc and a new portion read in. After the GIPs have finished processing, the data in the framestores is then scrolled, zoomed and/or amplified as necessary, mixed in the circuit 28, converted to monitor format and then displayed.

If the host 1 wishes to display menus on the screen, these are drawn into the mask GIP framestore 23, known as the "overlay plane".

Initially, the user creates a shape, such as a letter (FIG. 4), by suitably moving the pressure pen 31 over the tablet 5. Alternatively, the image could be obtained from the disks 11. The colour of each pixel in the image is stored as separate colour components in respective framestores 22 of the GIPs 15-18 At the same time a monochrome version of the image is stored in the framestore 22 of the mask GIP 19 which has previously been cleared to "0".

When the "edge crawl" function is desired, an appropriate menu command is selected (step 40 FIG. 3). A circular cursor is then presented on the screen 30. The user moves this cursor around the screen using the pen 31 and tablet 5 in the normal manner. The cursor would be placed over part of the outline of the object where a change in brush setup is required. The pen 31 would be pressed down, working as a switch to inform the host 1 that this place is special (step 41). Then the brush menu appears on the monitor 30 so that the user can set up the required brush profile for use from that point (step 42) which is then stored by the host 1. The user can repeat this process around the edge of the object as often as required. The host software builds up a list of coordinates, each of which is associated with a list of parameters for setting up a new brush (e.g. coordinates 33, 34, FIG. 4).

The host 1 then determines the location of the edge to be crawled by issuing a command and data packet that propagates to each of the GIPS 15-19. The packet contains the address of the edge crawl function in the code store of the GIPS and an x,y address. The address is the position of the cursor in the image signifying a start point for the edge-crawl function. The software in the GIPS now does most of the work. Only the mask GIP 19 contains any useful information at this stage because it always contains the outlines of any drawing, irrespective of colour.

The algorithm on the GIPS 15-19 is such that from the given start point in the mask framestore 22 data in the framestore is examined in a certain search pattern. From the start point, the pixel immediately above is tested to see if it has a value of zero, and if this is true, the pixel above is checked. This continues until a non-zero pixel is detected, which should mean that the edge of the "0" 32 has been found. Having found a non-zero pixel to the "north" of the current position, the host 1 stores the coordinates of this pixel in a memory buffer. The software can then look "east", "west", or "south" for a zero pixel. A conventional algorithm ensures that coordinates are logged every so often around the shape of the object. This process continues until the start point on the object is re-encountered. The function from the GIPS point of view terminates here (step 44).

The host 1 is fed the coordinate data in batches from the GIP 19 until the GIP indicates that the tracking algorithm has tracked around the object completely. This is done by passing special values to the host that cannot be misinterpreted as coordinate data. The host 1 organises the buffers of coordinates into a single buffer, which it then filters and rationalizes. In a conventional system the coordinate buffer is then given to and used by the brush drawing code, exactly as if it were coordinate data that originated from the digitizing tablet, following some drawing action by the user. The current brush (type, colour, profile) is drawn into the colour and mask framestores 22. The host "tells" the GIPs to use the buffer cordinates when painting.

In this invention, however, the host 1 knows about the existence of the coordinate/brush parameter list, so after initiation of brush crawl (step 45) the host 1 compares coordinates in this list with those in the list that have come in from the GIPS (step 46). The programmed coordinates are not absolute single coordinates, but are small regions centered around the actual coordinate. If the user has carefully "marked" the edge of the object then a GIP coordinate is likely to pass through this region of interest. This means that GIP coordinates must each be tested to see if they pass close to the programmed coordinates. If they do so (step 47), then the GIP coordinates can be broken in a number of separate coordinate lists each associated with a particular brush set up. Each of these lists can be used by the brush code to paint different outlines around the same object.

In the example where the user wishes to "emboss" the letter "O" 32 program mode would be entered and a circular cursor would be moved onto the bottom left "corner" of the letter's outline on the screen. The pen is pressed and the the "start brush" would be defined and stored associated with the start coordinates. For example white and some style of roundbrush. Next the user moves the cursor to the top right corner of the outline, presses and selects a black brush. The edge crawl function is then invoked in the normal way. The GIP 19 returns a coordinate list from around the outline to the host 1 as described above. The list is processed by the host 1 such that it will produce two coordinate lists, one starting from the bottom left corner of the letter on the screen, and one starting from the top right corner and ending at the bottom left. The important thing is that the host can find from the list of edge coordinates the first pair to pass within some arbitrary number of pixels from the first program point that the user entered. This coordinate is extracted from the list and placed at the start of a new list, as are all further coordinates until either the end of the original buffer is reached (i.e. back to the start point on the figure), or until a coordinate passes sufficiently near to the second program point, in which case a new list will be started. Ultimately, each of these lists "drives" the brush code, producing an embossing function (or many other effects).

I claim:

1. A method of electronically modifying the appearance of an image stored in the form of digital data defining the colour content of the image, the method comprising the steps of: storing sets of coordinates defining positions around the edge of the image, and for each set of coordinates storing the characteristics of an electronic painting tool, including the profile of the tool, with successive stored characteristics being different; and thereafter displaying the image, guiding the painting tool around the edge of the image, comparing the current position of the tool with the sets of stored coordinates, and when the tool is at or in the region of a set of stored coordinates, changing the tool characteristics to those previously determined for that set of coordinates.

2. A method according to claim 1, where the tool profile comprises one or more of the geometric form of the tool, the density variation within the area of the tool, and the colour laid down by the tool.

3. Apparatus for electronically modifying the appearance of an image stored in the form of digital data defining the colour content of the image, the apparatus comprising a store for storing sets of co-ordinates defining positions around the edge of the image and, for each set of co-ordinates, storing the characteristics of an electronic painting tool successive stored characteristics being different, including the profile of the tool; a monitor for displaying the image; and processing means for guiding the painting tool around the edge of the image, comparing the current position of the tool with the sets of stored co-ordinates, and when the tool is at or in the region of a set of stored co-ordinates, changing the tool characteristics to those previously determined for that set of co-ordinates.

* * * * *